United States Patent
Guillez et al.

(10) Patent No.: US 6,679,539 B2
(45) Date of Patent: Jan. 20, 2004

(54) SLIDING ROOF SYSTEM FOR COVERTIBLE VEHICLE

(75) Inventors: Jean-Marc Guillez, Cerizay (FR); Paul Queveau, Cerizay (FR); Gerard Queveau, Cerizay (FR)

(73) Assignee: Societe Europeene de Brevets Automobiles (FR)

( * ) Notice: Subject to any disclaimer, the term of this patent is extended or adjusted under 35 U.S.C. 154(b) by 0 days.

(21) Appl. No.: 10/204,924

(22) PCT Filed: Apr. 11, 2001

(86) PCT No.: PCT/FR01/01120

§ 371 (c)(1), (2), (4) Date: Oct. 25, 2002

(87) PCT Pub. No.: WO01/79011

PCT Pub. Date: Oct. 25, 2001

(65) Prior Publication Data

US 2003/0047962 A1 Mar. 13, 2003

(30) Foreign Application Priority Data

Apr. 14, 2000 (FR) .............................................. 00 04863

(51) Int. Cl.$^7$ .................................................. B60J 7/14
(52) U.S. Cl. ............. 296/107.07; 296/108; 296/107.17; 296/107.18
(58) Field of Search ............................ 296/107.01, 108, 296/107.07, 107.04, 107.16, 107.17, 107.18

(56) References Cited

U.S. PATENT DOCUMENTS

| | | | | | |
|---|---|---|---|---|---|
| 4,784,428 A | * | 11/1988 | Moy et al. | ............. | 296/107.07 |
| 4,852,935 A | * | 8/1989 | Varner | .................... | 296/146.14 |
| 6,123,381 A | * | 9/2000 | Schenk | .................... | 296/107.07 |
| 6,131,988 A | * | 10/2000 | Queveau et al. | ........ | 296/107.17 |
| 6,382,703 B1 | * | 5/2002 | Queveau et al. | ........ | 296/107.17 |
| 6,497,446 B2 | * | 12/2002 | Obendiek | .............. | 296/107.17 |
| 6,578,898 B2 | * | 6/2003 | Rothe et al. | ........... | 296/107.07 |
| 6,585,310 B1 | * | 7/2003 | Guillez et al. | .............. | 296/108 |

FOREIGN PATENT DOCUMENTS

| | | | | | |
|---|---|---|---|---|---|
| DE | 19737259 A | * | 3/1999 | .............. | B60J/7/08 |
| EP | 0956990 A | * | 11/1999 | .............. | B60J/7/14 |

\* cited by examiner

Primary Examiner—Stephen T. Gordon
Assistant Examiner—Patricia L. Engle
(74) Attorney, Agent, or Firm—Bachman & LaPointe, P.C.

(57) ABSTRACT

The rear roof element includes a central element that is movable relative to said rear roof element. The central element is connected on either side of the vehicle to the bodywork by two pivot arms comprising a front arm and a rear arm, and is hinged about respective front and rear hinge axes carried by respective ends of the corresponding pivot arms whose respective opposite ends are hinged to the bodywork of the vehicle.

10 Claims, 3 Drawing Sheets

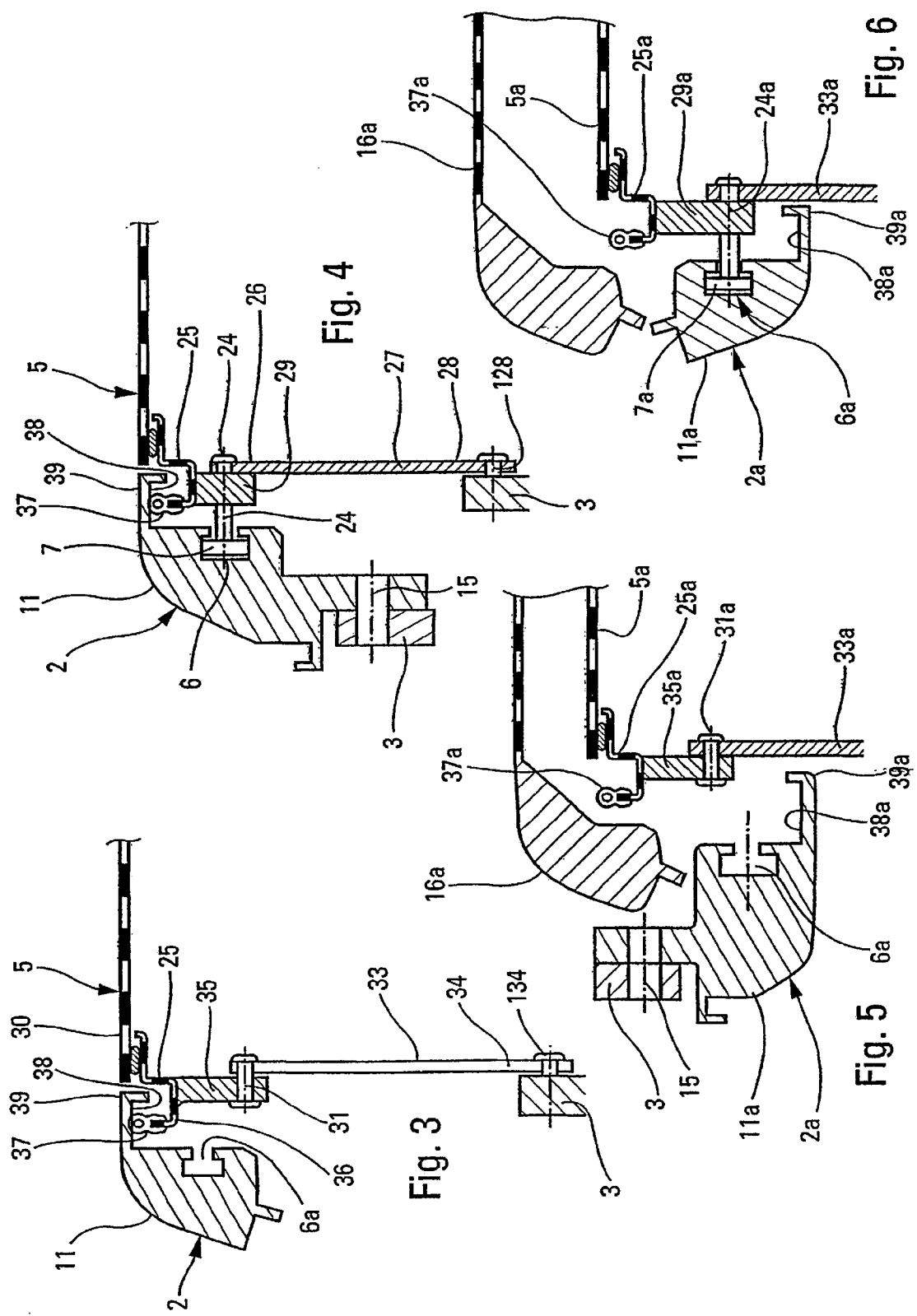

SLIDING ROOF SYSTEM FOR COVERTIBLE VEHICLE

BACKGROUND OF THE INVENTION

The present invention relates to an opening roof system for a convertible vehicle.

European patent application EP-A-0 956 990 in the name of the Applicant discloses an opening roof system for a convertible vehicle, which system comprises at least one rear roof element that is movable relative to the bodywork of said vehicle between a closed position and a position where it is stored in the rear trunk of the vehicle. In this stored position, the rear roof element has its concave side facing upwards. The rear roof element has a central element that is movable relative to said rear roof element.

The roof system also comprises means for guiding said central element during the displacement of said rear element, which means are adapted to maintain said central element substantially parallel to itself during its corresponding displacement between its closed position and its stored position in said rear trunk.

The central element which is constituted by the rear window of the vehicle is guided by arms that are hinged to the chassis and to the rear roof element, thus enabling the rear window to be guided and positioned accurately inside the rear trunk of the vehicle.

While the rear roof element is pivoting in a first direction relative to the bodywork of the vehicle, the central window pivots in the opposite direction relative to the rear roof element.

Although that opening roof system gives full satisfaction concerning the accuracy with which the rear window is guided, it nevertheless presents two drawbacks:

because the rear window pivots relative to the rear roof element, the side edges of the rear window must be parallel to the longitudinal axis of the vehicle; and for the same reason, it is difficult to obtain good sealing at the hinge points.

SUMMARY OF THE INVENTION

An object of the present invention is to remedy the drawbacks of known opening roof systems, and to propose an opening roof system of the above-specified type which is of simple structure and reliable, making it possible both to obtain very accurate guidance and positioning of the rear window in all of its positions, and to obtain excellent sealing around the entire periphery of the rear window when the opening roof is in its closed position.

According to the present invention, the opening roof system for a convertible vehicle of the above-specified type is characterized in that the central element is connected on either side of the vehicle to the bodywork via two pivot arms, respectively a front arm and a rear arm, and is hinged to respective front and rear hinge axes carried by respective ends of the corresponding pivot arms whose respective opposite ends are hinged to the bodywork of the vehicle, said pivot arms being arranged in such a manner as to guide said central element to its stored position, each of the front and rear hinge axes following a respective predetermined path.

Thus, the central element is free to move relative to the rear roof element about a hinge axis whose ends slide in the above-specified slideways.

It is thus easy to determine the respective trajectories of the rear roof element and of the central element in such a manner as to enable the above-specified drawbacks of known opening roofs to be eliminated.

The rear roof element and the central element can be driven by any known drive means, for example by electric motors that are independent of each other.

In an advantageous version of the present invention, the rear element is constituted by two side portions of bodywork extending over respective sides of the vehicle, the central element being advantageously constituted by the rear window.

The rear roof element thus has no transverse element that might impede the movement of the central element relative to the two mutually independent side portions of the rear roof element.

In a preferred version of the invention, the rear roof element includes respective slideways on either side of the vehicle, the slideways extending substantially longitudinally and being adapted slidably to receive respective wheels secured to the corresponding rear side ends of the central element, and each wheel travels along the corresponding slideway in such a manner as to control the displacement of said central element to its storage position as a function of the displacement of the rear roof element.

In this way, a single electric motor driving the rear roof element suffices also to drive the central element which has each of its wheels driven by the corresponding slideway. The movement of the central element which can be linear or non-linear is thus controlled relative to that of the rear roof element as a function of the shape and the position of each slideway.

Other features and advantages of the present invention appear from the following detailed description.

BRIEF DESCRIPTION OF THE DRAWINGS

In the accompanying drawings, given purely by way of non-limiting example:

FIG. 3 is a fragmentary view in section on III—III of FIG. 1;

FIG. 4 is a fragmentary view in section on IV—IV of FIG. 1, the roof being shown in its closed position;

FIG. 5 is a fragmentary view in section on V—V of FIG. 1, the roof being shown in its position stored inside the rear trunk; and FIG. 6 is a fragmentary view in section on VI—VI of FIG. 1, the roof being in its position stored in the rear trunk.

DETAILED DESCRIPTION OF THE PREFERRED EMBODIMENT(S)

Figure 1:
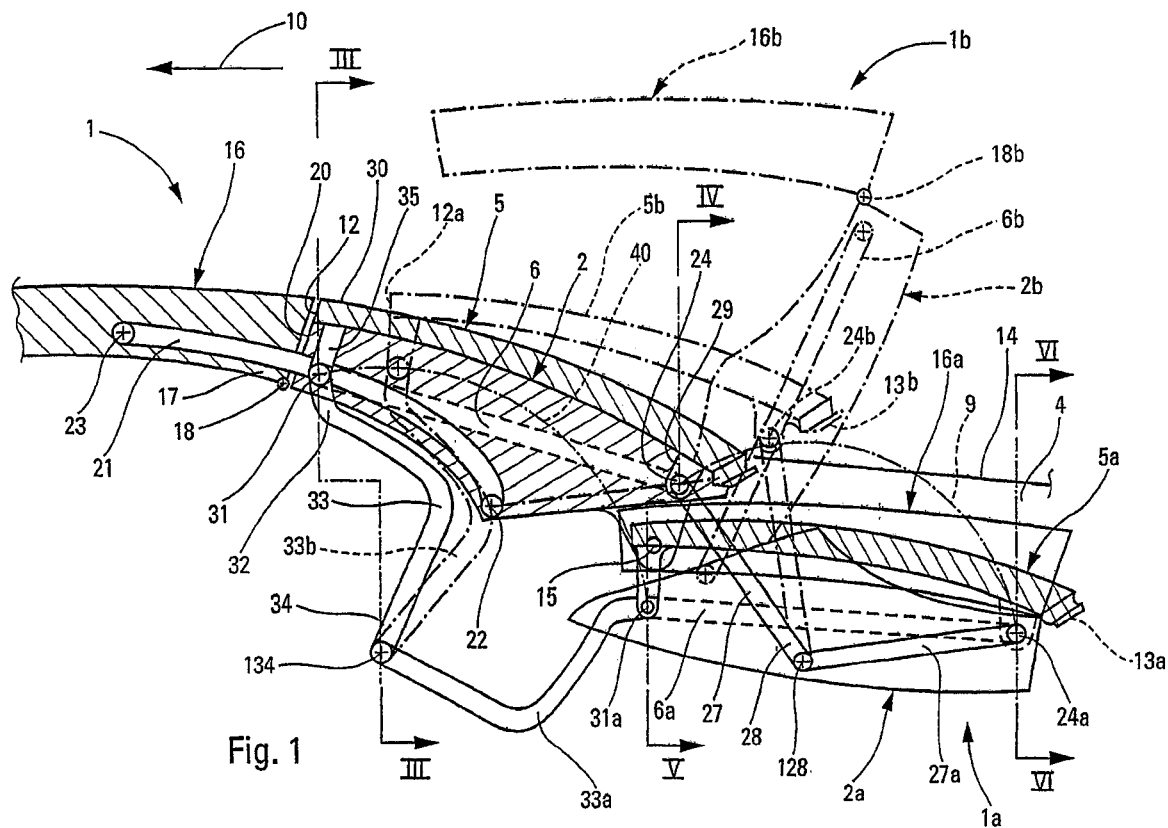
FIG. 1 is a diagrammatic longitudinal section view of an opening roof system for a convertible vehicle and constituting an embodiment of the present invention, the elements of this opening roof system being shown in their closed position, in an intermediate position, and in their stored position inside the rear trunk of the vehicle.
Figure 2:
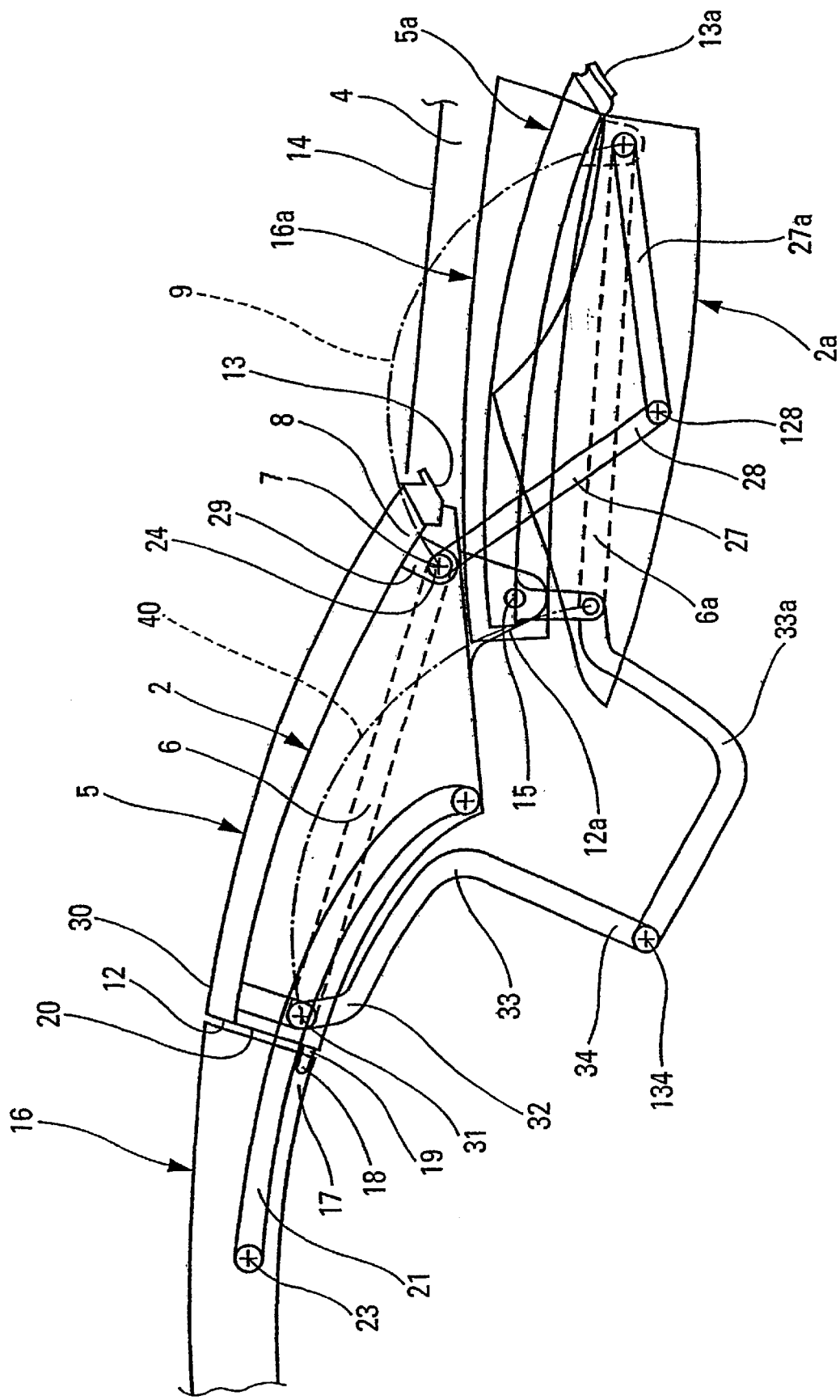
FIG. 2 is a simplified view similar to FIG. 1.

In the embodiment shown in the figures, the opening roof system 1 for a convertible vehicle comprises at least one rear roof element 2 that is movable relative to the bodywork 3 of said vehicle between a closed position and a stored position in the rear trunk 4 of the vehicle, as shown in continuous lines in FIGS. 1 and 2.

In FIG. 1, chain-dotted lines are used to show an intermediate position 1b of the roof 1, the various component elements of said roof 1 then being given references associated with the letter b.

In the stored position 1a of the roof 1 in the rear trunk 4 of the vehicle, the rear roof element 2 in its position 2a has its concave side facing upwards.

The rear roof element 2 has a central element 5 that is movable relative to said rear roof element 2.

The roof system 1 also comprises means for guiding the central element 5 that are adapted to maintain said central element 5 substantially parallel to itself during its displacement between its closed position 5 and its stored position 5a in the rear trunk 4 during the corresponding displacement of the rear element 2.

Thus, in its stored position 5a, the central element 5 has its concave side facing downwards as it does in its closed position, thereby occupying (optionally together with a front roof element, see below), the volume available adjacent to the concave side of the rear roof element 2 in its position 2a.

In the present invention, the rear roof element 2 has respective slideways 6 on either side of the vehicle, each being adapted slidably to receive a respective wheel 7 secured to the corresponding rear side end 8 of the central element 5.

In addition, the means for guiding the central element 5 comprise means for constraining the wheel 7 to move along a predetermined trajectory 9 so as to guide said central element 5 to its stored position 5a.

The present description relates to the component elements of the opening roof system of the invention as shown in FIGS. 1 and 2 and located on the same side of the bodywork 3 of the corresponding vehicle, and specifically the right-hand side for a vehicle whose front end lies in the direction of arrow 10, i.e. to the left of FIGS. 1 and 2.

Naturally, the same component elements are disposed on the other side of the vehicle symmetrically about the longitudinal vertical midplane of the vehicle lying parallel to the plane of the FIGS. 1 and 2.

In the embodiment shown, the rear element 2 is constituted by two side portions 11 of bodywork, also referred to as rear "quarters", extending over respective sides of the vehicle, the two portions 11 not being connected together by any transverse element.

In the present example, the central element 5 is constituted by the rear window of the vehicle, the rear window extending longitudinally from its front edge 12 to its rear edge 13 which, in longitudinal section, has a gutter shape so as to make it easier to achieve a leaktight connection with the cover of the rear trunk 4 represented diagrammatically at 14.

Each quarter 11 is hinged at a hinge point 15 to the bodywork 3 on the corresponding side of the vehicle, the hinge point 15 naturally being arranged in such a manner that the quarter 11 is self-supporting.

For a rear roof element 2 comprising a single piece constituted by two quarters 11 interconnected by at least one transverse element (not shown), then the element 2 would be in the form of an arch and would be hinged at two points 15 located substantially at the ends of the branches of said arch.

In the examples of FIGS. 1 and 2, the opening roof system further comprises a front roof element 16 hinged at each of its rear side ends 17 to respective hinge points 18 carried by the front edge 20 of the rear roof element 2 or of the corresponding quarter 11, e.g. by means of corresponding fingers 19 projecting forwards from the front edge 20.

The front roof element 16 is also connected to the bodywork 3 on either side of the vehicle by a connection arm 21 hinged at its rear end 22 to the bodywork 3 and at its front end 23 to the front roof element 16.

Thus, during rearward pivoting of the rear roof element 2 or of the quarters 11, the front roof element 16 pivots about the hinge points 18 and is guided by the connection arms 21 in such a manner as to remain substantially parallel to itself during its displacement between its closed position and its stored position 16a inside the rear trunk 4 of the vehicle, its concave side facing downwards, like the rear window 5.

As shown diagrammatically in FIGS. 4 and 6, each wheel 7 is mounted on a corresponding rear hinge axis 24 carried by the rear window 5 and by a top end 26 of a respective rear pivot arm 27 whose opposite, bottom end 28 is hinged at 128 to the bodywork 3 of the vehicle.

In order to make it easier to dispose each slideway 6 in the corresponding quarter 11, each rear hinge axis 24 is carried by a respective tab 29 extending downwards from the corresponding rear side end 8 of the rear window 5 or from a corresponding piece of side reinforcement 25.

As shown in detail in FIGS. 3 and 5, the rear window 5 is hinged at each front side end 30 on a front hinge axis 31 carried firstly by the corresponding side reinforcement 25 and secondly by a top end 32 of a front pivot arm 33 whose opposite, bottom end 34 is hinged at 134 to the bodywork 3 of the vehicle.

Each front hinge axis 31 is carried by a respective tab 35 extending downwards from the front side end 30 of the rear window 5 or of the corresponding side reinforcement 25.

Reference 40 in FIGS. 1 and 2 designates the path followed by said axis 31.

The two slideways 6 are preferably parallel so that each wheel 7 can be mounted in a fixed position on the corresponding hinge axis 24.

Otherwise, it would be possible to make provision for the axis 24 carrying the wheel 7 to be capable of moving sideways relative to the corresponding arm 27 which necessarily pivots in a longitudinal vertical plane, like the front arm 33.

The operation of the opening roof system in the above-described embodiment is simple.

An electric motor and gear-box unit (not shown) or any other actuator means, e.g. hydraulically or manually operated, causes each quarter 11 or the rear roof element 2 to pivot in one direction or the other.

The rear window 5 can be actuated in parallel by other actuator means independent of the first, and driving one of the arms 27 or 33. In which case, the slideways 6 and the wheels 7 are unnecessary and can be omitted.

Nevertheless, care must be taken to ensure that the rear window remains continuously on the same side, e.g. on the inside of the quarters or of the rear roof element 2 so as to make it possible in the closed position of the roof to press the rear window 5 against a gasket such as 37 extending over the entire length of the common edge between the window 5 and the quarter 11 or the rear roof element 2.

In the embodiment shown in the figures, each of the front arms 33 and the rear arms 27 is of fixed shape and length, such that the paths 40 and 9 are circular paths.

The arms 27, 33, the hinge axes 31, 134, 24, 18 of the rear window 5, the quarters 11 with their hinge axes 15, the slideways 6, and the wheels 7 are all arranged in such a manner that at all times during opening or closing of the opening roof system, the rear window 5 lies on that side of the quarters 11 that faces towards the inside of the vehicle.

In this embodiment, it suffices to pivot the two quarters 11 or the rear roof element 2 in order to drive the rear window 5 and the front roof element 16.

The slideway 6 of each quarter constrains the corresponding wheel 7 to move along its corresponding trajectory 9, thereby causing the rear window 5 to travel under the guidance of the pivot arms 27 and 33.

An opening roof system for a convertible vehicle has thus been described that corresponds fully to the above-specified objects of the invention.

The above-described system and in particular the assembly formed on each side of the vehicle by the two pivot arms 27 and 33 and by each slideway 6 and its respective wheel 7 makes it possible to keep the rear window 5 in a position which is always situated on the same side of each of the two side quarters 11, i.e. its side facing towards the inside of the vehicle.

This applies in the closed position of the roof as shown in FIGS. 3 and 4 where it can be seen that the side reinforcement 25 carries a sealing gasket 37 at the top portion of its outside edge, which gasket is pressed against the bottom surface 38 of the inside edge 39 of the corresponding quarter 2.

This also applies in the stored position 1a of the roof 1 inside the rear trunk 4 with the concave sides of the quarters 11 in position 11a facing upwards and the rear window 5 in position 5a is situated above the inside surfaces 38 in position 38a (see FIGS. 5 and 6).

Finally, in the intermediate position identified by letter b, the rear roof in position 2b has pivoted through about 90° relative to its closed position 2, while the arms 27 and 33 have pivoted through an angle that is considerably smaller under drive from the wheel 7 carried by the axis 24 in position 24b, which has already traveled about halfway along the slideway 6.

The lateral reinforcement 25, the outside edge 36 of said reinforcement 25, the sealing gasket 37, and the inside edge 39 of the quarter 11 do not need to be parallel to the longitudinal axis of the vehicle, as represented by arrow 10 in FIGS. 1 and 2.

It suffices that the rear pivot arms 27 and the front pivot arms 33 pivot in respective vertical planes that are parallel to the longitudinal axis of the vehicle, the hinge axes extending in the transverse direction of the vehicle perpendicular to said longitudinal axis.

The side edges of the rear window 5 therefore do not need to be parallel to said longitudinal axis.

Naturally, the present invention is not limited to the embodiment described above, and numerous changes and modifications can be made thereto without going beyond the ambit of the invention.

What is claimed is:

1. An opening roof system for a convertible vehicle, the system comprising at least a rear roof element movable relative to the bodywork of said vehicle between a closed position and a stored position in a rear trunk of the vehicle, the rear roof element having its concave side facing upwards, said rear roof element being hinged on either side of the bodywork of the vehicle at a corresponding hinge point, and including a central element that is movable relative to said rear roof element, guide means for guiding said central element to maintain said central element substantially parallel to itself during its displacement between its closed position and its stored position in said rear trunk during the corresponding displacement of said rear roof element, the central element being connected on either side of the vehicle to the bodywork via two pivot arms which include a front arm and a rear arm, and being hinged to respective front and rear hinge axes carried by respective ends of the corresponding pivot arms whose respective opposite ends are hinged to the bodywork of the vehicle, said pivot arms being arranged in such a manner as to guide said central element to its stored position and to impose on each of the front and rear hinge axes a respective predetermined path, and the rear roof element comprising means for cooperating with complementary means of said central element in such a manner as to control the displacement of said central element as a function of the displacement of the rear roof element.

2. An opening roof system according to claim 1, wherein the complementary means of the central element and of the rear roof element are arranged so as to hold the central element on the inside of the rear roof element.

3. An opening roof system according to claim 1, further comprising the rear roof element having on either side of the vehicle a respective slideway extending substantially longitudinally and adapted slidably to receive a respective wheel secured to the corresponding rear side end of the central element, and each wheel moving along the corresponding slideway in such a manner as to control the displacement of said central element to its stored position as a function of the displacement of the rear roof element.

4. An opening roof system according to claim 3, wherein the two slideways are parallel.

5. An opening roof system according to claim 3, wherein each wheel is mounted on a corresponding rear hinge axis of the central element carried by the respective end of the respective rear pivot arm.

6. An opening roof system according to claim 5, further comprising each rear hinge axis being carried by a respective tab extending downwards from the corresponding rear side end of the central element.

7. An opening roof system according to claim 1, further comprising each front hinge axis being carried by a respective tab extending downwards from a corresponding front side end of the central element.

8. An opening roof system according to claim 1, wherein the rear roof element is constituted by two side portions of said bodywork extending over respective sides of the vehicle, and the central element is constituted by a rear window.

9. An opening roof system according to claim 1, further comprising a front roof element hinged at each of its rear side ends to a respective hinge point carried by a front edge of the rear roof element.

10. An opening roof system according to claim 9, further comprising the front roof element also being connected to the bodywork on either side of the vehicle by a respective connection arm hinged at its rear end to the bodywork and at its front end to the front roof element.

* * * * *